(12) United States Patent
Andrina et al.

(10) Patent No.: US 12,552,342 B2
(45) Date of Patent: Feb. 17, 2026

(54) WEB RETRACTORS FOR PERSONAL RESTRAINT SYSTEMS AND ASSOCIATED SYSTEMS AND METHODS

(71) Applicant: Shield Restraint Systems, Inc., Elkhart, IN (US)

(72) Inventors: Eric David Andrina, Cassopolis, MI (US); Kurt Allen Schultz, Mishawaka, IN (US); Eduardo Salcedo Lopez, Pflugerville, TX (US)

(73) Assignee: SHIELD RESTRAINT SYSTEMS, INC., Elkhart, IN (US)

( * ) Notice: Subject to any disclaimer, the term of this patent is extended or adjusted under 35 U.S.C. 154(b) by 220 days.

(21) Appl. No.: 18/363,493

(22) Filed: Aug. 1, 2023

(65) Prior Publication Data
US 2025/0042354 A1   Feb. 6, 2025

Related U.S. Application Data

(60) Provisional application No. 63/395,687, filed on Aug. 5, 2022.

(51) Int. Cl.
*B60R 22/347*   (2006.01)
*B60R 22/34*    (2006.01)

(52) U.S. Cl.
CPC .... *B60R 22/347* (2013.01); *B60R 2022/3402* (2013.01)

(58) Field of Classification Search
CPC ................ B60R 22/347; B60R 22/405; B60R 2022/3402
See application file for complete search history.

(56) References Cited

U.S. PATENT DOCUMENTS

| 9,150,190 B2 * | 10/2015 | Jessup | A62B 35/0093 |
| 9,266,497 B2 * | 2/2016 | Jessup | B60R 22/40 |
| 10,166,947 B2 * | 1/2019 | Clark | B60R 22/405 |

* cited by examiner

*Primary Examiner* — Sang K Kim
(74) *Attorney, Agent, or Firm* — Perkins Coie LLP

(57) ABSTRACT

Web retractors and associated systems and methods for retracting a web, such as a seat belt web, are disclosed herein. In some embodiments, a sealed web retractor includes a frame having a side wall with a first opening, a locking assembly housing attached to the side wall and having a second opening adjacent to the first opening, and a spool shaft having a portion that extends through the first and second openings. In some embodiments, the retractor can further include a bushing and a seal operably disposed in the first opening and extending around an outer periphery of the spool shaft.

20 Claims, 12 Drawing Sheets

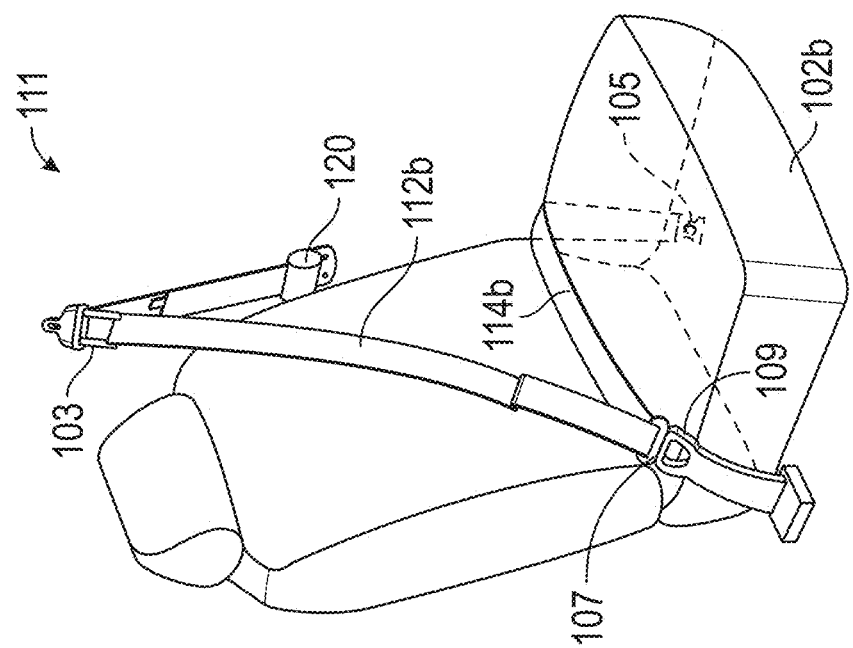
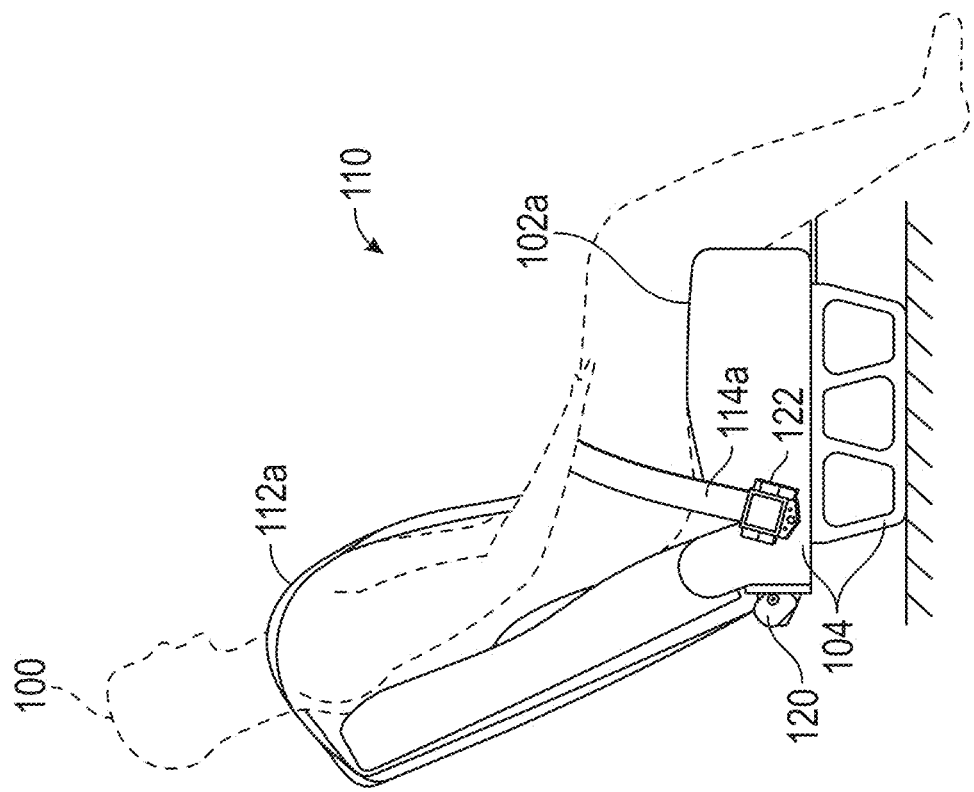

ns and Methods

WEB RETRACTORS FOR PERSONAL RESTRAINT SYSTEMS AND ASSOCIATED SYSTEMS AND METHODS

CROSS REFERENCE TO RELATED APPLICATION

This application claims the benefit of U.S. Provisional Patent Application No. 63/392,687, filed Aug. 5, 2022, and titled "WEB RETRACTORS FOR PERSONAL RESTRAINT SYSTEMS AND ASSOCIATED SYSTEMS AND METHODS," which is incorporated herein by reference in its entirety.

TECHNICAL FIELD

The present disclosure is generally related to seat belt web retractors and associated systems and methods.

BACKGROUND

Seat belt systems are used to restrain occupants in automobiles, aircraft, recreational utility vehicles (RUVs), and other vehicles in the event of a crash or other potentially unsafe or harmful dynamic event. In automobiles, for example, seat belt systems typically include a belt or web that can be pulled from a retractor positioned on one side of a seat, extended across the occupant's body, and releasably engaged with a buckle positioned on the opposite of the seat. Web retractors typically include a spring-loaded spool that maintains tension in the web and retracts the web when it is not in use.

BRIEF DESCRIPTION OF THE DRAWINGS

FIG. 1A is a side view of an occupant in a vehicle seat having a restraint system with web retractors configured in accordance with embodiments of the present technology, and FIG. 1B is an isometric view of another vehicle seat having an occupant restraint system with a web retractor configured in accordance with embodiments of the present technology.

DETAILED DESCRIPTION

Figure 2A:
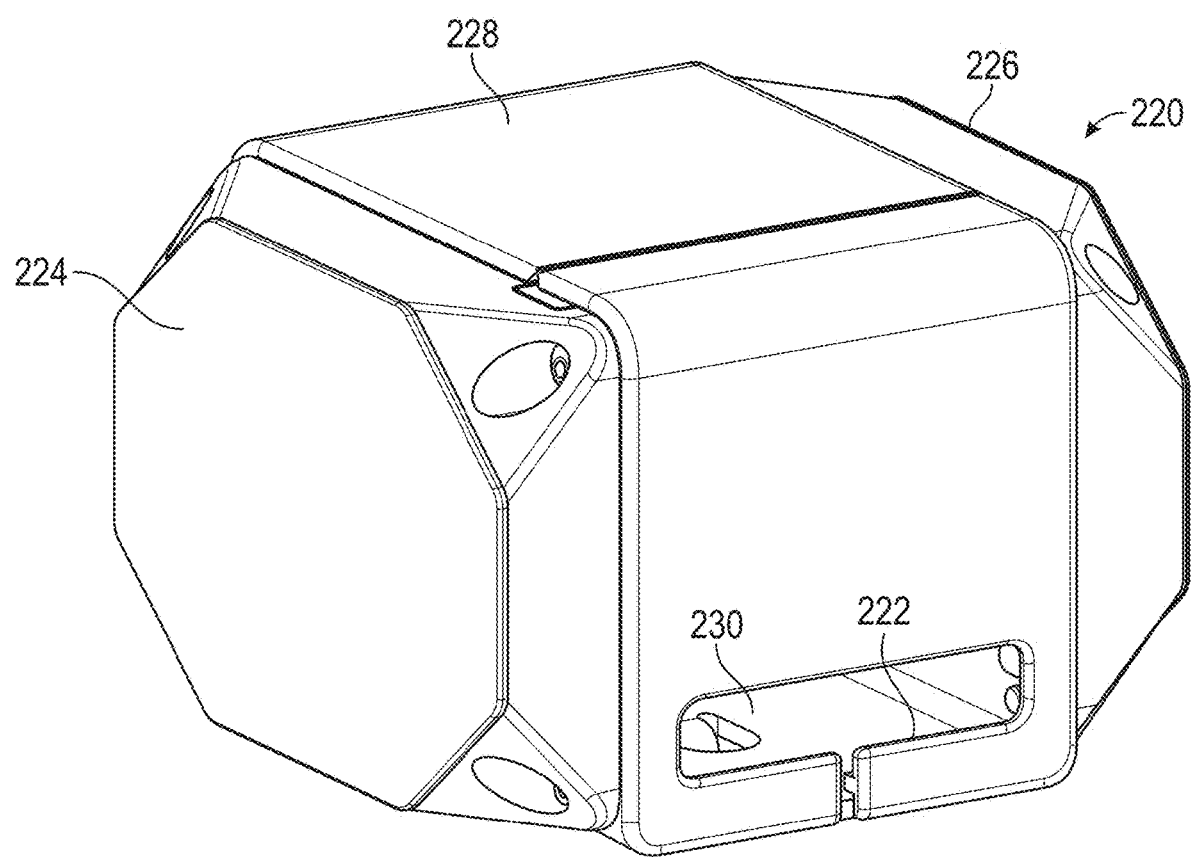
FIG. 2A is a front isometric view of a web retractor configured in accordance with embodiments of the present technology.

The following disclosure describes various embodiments of apparatuses, systems, and associated methods for retracting a web, such as a seat belt web. In some embodiments, for example, a sealed web retractor configured in accordance with the present technology includes a frame having a first side wall with a first opening, a second side wall with a second opening, and a spool shaft having a first end portion extending through the first opening and a second end portion extending through the second opening. A locking assembly contained in a housing can be attached to the first side wall and operably coupled to the first end portion of the spool shaft, and a gasket can be positioned between the housing and the first side wall and around the first opening. In some embodiments, the retractor can further include a bushing and a seal that are operably positioned in the first opening between the spool shaft and the first side wall. In some embodiments, the seal together with the gasket can prevent, or at least restrict, moisture, fluids, dirt, and/or other unwanted substances from entering the locking assembly housing and potentially causing premature wear and/or improper operation of the web locking mechanism(s) therewithin. In some embodiments, the bushing can support the spool shaft under certain (e.g., relatively high) web loading conditions.

Certain details are set forth in the following description and in FIGS. 1A-6 to provide a thorough understanding of various embodiments of the present technology. In other instances, well-known structures, materials, operations and/or systems often associated with web retractors and/or associated components and methods are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. Examples of web retractors are disclosed in U.S. Pat. No. 10,166,947, which is commonly owned by the assignee of the present application. U.S. Pat. No. 10,166,947 is incorporated herein by reference in its entirety.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the present technology. Accordingly, other embodiments can have other details, dimensions, angles and features without departing from the spirit or scope of the present disclosure. In addition, those of ordinary skill in the art will appreciate that further embodiments of the present technology can be practiced without several of the details described below.

In the Figures, identical reference numbers identify identical, or at least generally similar, elements. To facilitate the discussion of any particular element, the most significant digit or digits of any reference number will in general refer to the Figure in which that element is first introduced. For example, element 110 is first introduced and discussed with reference to FIG. 1A.

FIG. 1A is a side view of an occupant 100 secured to a vehicle seat 102a with a restraint system 110 having a first web retractor 120 configured in accordance with embodiments of the present technology. By way of nonlimiting examples, the restraint system 110 can be a seat belt system used to secure the occupant 100 in ground vehicles (e.g., RUVs automobiles, trucks, off-road vehicles, etc.), water vehicles (e.g., boats, ships, jet skis, etc.), aircraft (e.g., private and military aircraft, etc.), and the like. In the illustrated embodiment, the first web retractor 120 can be fixedly attached to, e.g., a rear portion of seat frame 104 by means of bolts and/or other suitable fasteners known in the art and can include a spring-loaded spool (not shown in FIG. 1A) that carries a shoulder web 112a wound thereon.

In the illustrated embodiment, the restraint system 110 also includes a lap web 114a that can be carried by and deployed from a second web retractor 122 anchored to, e.g., a side portion of the seat frame 104. In some embodiments, the second web retractor 122 can be identical to, or at least substantially similar in structure and/or function to, the first web retractor 120. The shoulder web 112a and the lap web 114a can be conventional seat belt webs made from woven materials known in the art (e.g., nylon). In some embodiments, the webs 112a and 114a can be used in a conventional manner, such as by extracting the shoulder web 112a and the lap web 114a from the corresponding retractors 120 and 122, respectively, and releasably engaging connectors (not shown) carried by the distal end portions of the webs 112a and 114a into, e.g., a single buckle (not shown) or separate buckles (not shown) that can be anchored to the seat frame 104 or the floor of the vehicle (e.g., on the opposite side of the seat 102a from the second web retractor 122).

FIG. 1B is an isometric view of a restraint system 111 configured in accordance with additional embodiments of the present technology. The restraint system 111 includes components and features that are at least generally similar in structure and/or function to the restraint system 110 discussed above. For example, the restraint system 111 can include a seat 102b, a shoulder web 112b, a lap web 114b, and the first web retractor 120. In the illustrated embodiment, however, the first web retractor 120 is fixedly attached to a structure of the vehicle adjacent the seat 102b (e.g., a wall, a frame, roll bar, etc.). The shoulder web 112b slideably passes through a guide 103 (e.g., a D-ring) before extending downward into the first web retractor 120. The lap web 114b is fixedly attached to an anchor 105 on a floor of the vehicle adjacent to the seat 102b. A belt connector 107 can be slideably coupled to the shoulder web 112b and the lap web 114b. The belt connector 107 releasably engages a buckle 109 anchored to the floor of the vehicle opposite the anchor 105. In some embodiments, the vehicle-mounted retractor 120, like the seat-mounted retractors 120 and 122 described above with reference to FIG. 1A, can extend and retract the shoulder web 112b and the lap web 114b during normal use by a seat occupant, and lock the webs 112b and 114b to restrain the occupant in the event of a crash, rapid deceleration, and/or other dynamic event. In some embodiments, the retractors 120 and/or 122 can be mounted in other locations and/or in other positions, etc., such as to other portions of the vehicle (e.g., the vehicle floor), and/or to other equipment in and/or on the vehicle.

Although FIGS. 1A and 1B illustrate two possible configurations of seat belt systems, those of ordinary skill in the art will appreciate that the web retractors disclosed herein can be suitably employed in a wide variety of other configurations, seat belt systems, and vehicles in which seat belt web retractors are used. In some embodiments, for example, the restraint systems 110 and 111 can include additional webs (e.g., additional shoulder webs, crotch webs, etc.) and corresponding retractors. Accordingly, those of ordinary skill in the art will understand that the web retractors disclosed herein are not limited to use in any particular configuration, arrangement, vehicle, etc., unless otherwise stated.

Figure 2B:
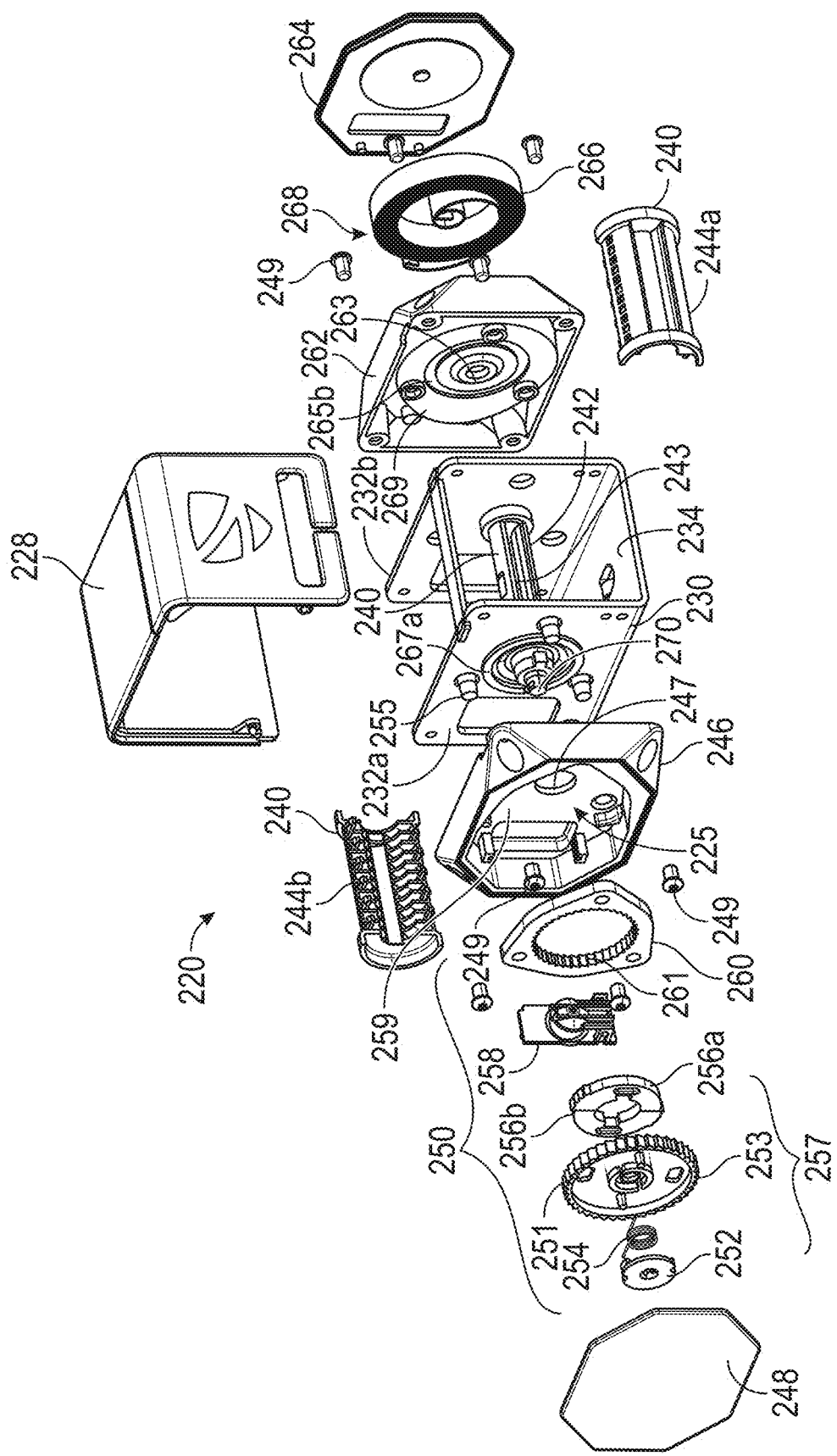
FIG. 2B is a partially exploded front isometric view of the web retractor.
Figure 2C:
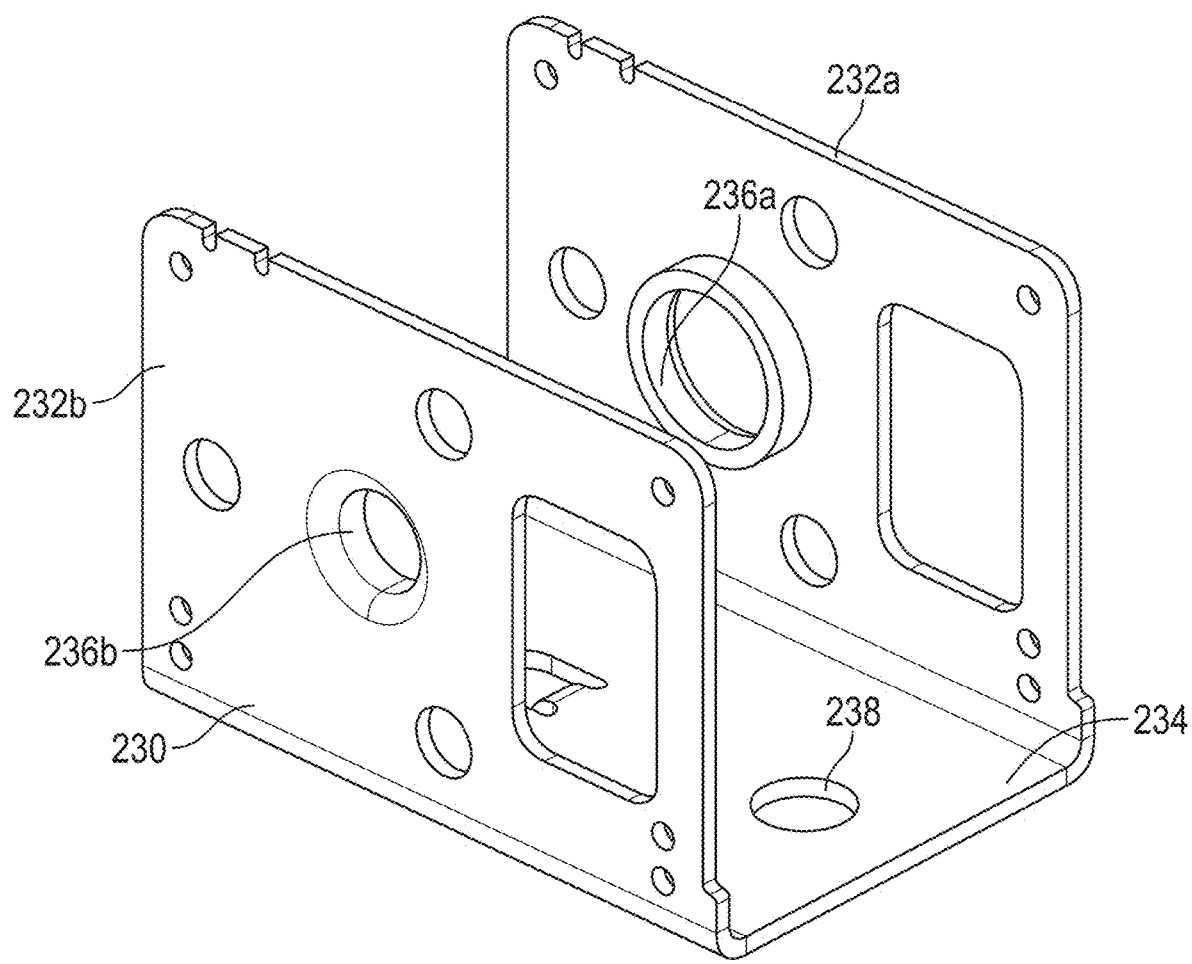
FIG. 2C is a rear isometric view of a frame of the web retractor.

FIG. 2A is a front isometric view of a sealed web retractor 220 ("web retractor 220" or "retractor 220") configured in accordance with embodiments of the present technology, FIG. 2B is a partially exploded front isometric view of the web retractor 220, and FIG. 2C is a rear isometric view of a frame 230 of the web retractor 220. Referring first to FIGS. 2A and 2C, the web retractor 220 includes a frame 230 having a first side wall 232a and a second side wall 232b extending (e.g., perpendicularly) from opposite sides of a base 234. In some embodiments, the web retractor 220 further includes a locking assembly housing 224 fixedly mounted to the first side wall 232a and a drive assembly housing 226 fixedly mounted to the second side wall 232b. In some embodiments, the web retractor 220 can further include a cover 228 that mounts to the frame 230 and encloses, or at least partially encloses, an interior portion of the frame 230 that contains a spool assembly 240 (FIG. 2B). Additionally, in the illustrated embodiment the cover 228 includes an opening 222 through which a spool-mounted web (e.g., a seat belt web; not shown) can extend from the retractor 220.

As shown in FIG. 2C, the frame 230 further includes a first circular opening 236a in the first side wall 232a and a second circular opening 236b in the second side wall 232b. In the illustrated embodiment, the first opening 236a is larger in diameter than the second opening 236b, and as described in greater detail below, the openings 236a, b are configured to receive respective end portions of a spool shaft (FIG. 2B). In some embodiments, the frame 230 additionally includes an opening or aperture 238 in the base 234 configured to receive a bolt and/or other suitable fastener or device to fixedly attach the web retractor 220 to, e.g., a seat base (e.g., the seat frame 104 as shown in FIG. 1A), a vehicle structure (e.g., as shown in FIG. 1B), and/or other suitable mounting portions of a vehicle. In other embodiments, the retractor 220 can be anchored to the vehicle using other suitable attachment means known in the art. In some embodiments, the frame 230 can be made from metal (e.g., by stamp-forming a metal (e.g., steel) sheet or plate, casting, forging, machining, etc.), structural polymers, composite materials, plastic and/or other suitable materials known in the art.

Turning next to FIG. 2B, the sealed web retractor 220 further includes a spool assembly 240 that extends between the first side wall 232a and the second side wall 232b and is rotatably supported in the first opening 236a and the second opening 236b. In the illustrated embodiment, the spool assembly 240 includes an outer portion or sleeve composed of a first sleeve half 244a and a second sleeve half 244b that are fixedly joined together and attached to a central spool shaft 242 (e.g., a spring-loaded spool shaft). The spool shaft 242 includes an elongate slot 243 configured to receive an end portion of a seat belt web that passes through adjacent openings in the sleeve halves 244a, b and through the slot 243 so that the end portion of the web can be securely attached to the spool assembly 240 (by, e.g., looping the end portion of the web over on itself and stitching it together) and wound thereabout for use. The spool shaft 242 can be made from metal (e.g., steel, aluminum, etc.) and/or other suitable materials known in the art, and the sleeve halves 244a, b can be made from, e.g., a plastic, metal, and/or other suitable materials known in the art.

In some embodiments, the locking assembly housing 224 (FIG. 2A) includes an inner housing portion 246 (which can also be referred to as a "housing," "housing base," "base portion," "inner cover," etc.) and an outer housing portion 248 (which can also be referred to as a "housing cover," "cover portion," "outer cover," etc.). In some embodiments, the inner housing portion 246 can be fixedly attached to the first side wall 232a of the frame 230 with one or more fasteners 249 (e.g., screws, bolts, rivets, etc.). In the illustrated embodiment, the inner housing portion 246 includes an inner cavity 225 (which can also be referred to as an "interior volume," "pocket," etc.) configured to house components of a locking mechanism assembly 250 ("locking assembly 250"). The inner housing portion 246 can also include a circular aperture or opening 247 in a base wall 259 configured to be coaxially aligned with the first opening 236a in the first side wall 232a and receive a first end portion 270 of the spool shaft 242. In some embodiments, the inner housing portion 246 and the outer housing portion 248 can be formed from plastic (e.g., injection-molded plastic), structural polymers, and/or other suitable materials known in the art. In some embodiments, the outer housing portion 248 can be bonded (e.g., welded) to the inner housing portion 246 using, e.g., laser, ultrasonic, hot plate, or other suitable welding and/or bonding techniques to form a hermetic seal between the outer housing portion 248 and the inner housing portion 246. In other embodiments, the outer housing portion 248 and the inner housing portion 246 can be attached together using fasteners, adhesives, and/or other suitable attachment techniques and/or sealing features (e.g., O-Rings, gaskets, etc.) known in the art. Accordingly, in some embodiments the outer housing portion 248 is joined to the inner housing portion 246 in such a way as to form a hermetic seal therebetween. It is contemplated, however, that in certain other embodiments the outer housing portion 248 may be joined to the inner housing portion 246 in a manner that does not create a hermetic seal therebetween.

In some embodiments, the locking assembly 250 includes a lock ring structure or lock ring 260 that can be fixedly attached to the first side wall 232a by a plurality of studs or posts 255 that protrude outwardly from the first side wall 232a and extend through corresponding apertures in the base wall 259 of the inner housing portion 246. In the illustrated embodiment, the lock ring 260 includes a plurality of teeth 261 formed on an interior side wall of a circular aperture therein. In some embodiments, the locking assembly 250 can also include a first locking feature, e.g., a first locking pawl 256a, and a second locking feature, e.g., a second locking pawl 256b, which are configured to be operably coupled to the first end portion 270 of the spool shaft 242 and operably disposed in the circular aperture in the lock ring 260. The locking assembly 250 can further include a lock wheel 251 that is operably retained on the first end portion 270 of the spool shaft 242 by means of a retainer 252. In some embodiments, a biasing member, e.g., a torsion spring 254 (which can also be referred to as a "web sense spring") is operably coupled between the retainer 252 and the lock wheel 251 and configured to exert a torsional biasing force against the lock wheel 251. As described in greater detail below, in some embodiments, the lock wheel 251 and the spring 254 can function as a web inertia sensor 257 that functions to lock the spool assembly 240 (FIG. 2B) and prevent further extraction of the web (not shown) when the web is extracted from the retractor 220 above a predetermined threshold acceleration. In addition to the foregoing components, the locking assembly 250 can additionally include a vehicle inertia sensor 258 that, as described in greater detail below, is operably mounted to the inner housing portion 246 in the cavity 225 adjacent to the lock wheel 251.

In some embodiments, the lock wheel 251 can be made from a suitable metal, plastic (e.g., polyoxymethylene), and/or other materials. In some embodiments, the locking pawls 256a, b and the lock ring 260 can be made from a metal. In other embodiments, the locking pawls 256a, the lock ring 260, and/or the lock wheel 251 can be made from a rigid plastic with low moisture sensitivity, such as glass-filled polypropylene and/or other glass-filled plastic materials.

In the illustrated embodiment, the drive assembly housing 226 (FIG. 2A) includes an inner housing portion 262 and an outer housing portion 264. In some embodiments, the inner housing portion 262 includes an annular recess 265b in a base wall 269 thereof. The recess 265b is configured to receive a second annular seal or gasket 267b (not shown in FIG. 2B; shown in FIG. 3A) to seal the interface between the inner housing portion 262 and the outer surface of the second side wall 232b. In some embodiments, the second gasket 267b that fits into the annular recess 265b can be identical in configuration to a first annular gasket 267a that is configured to be received in a corresponding annular recess (not shown in FIG. 2B) in the base wall 259 of the inner housing portion 246 of the locking assembly housing 224. In this regard, the annular recess in the inner housing portion 246 can have the same configuration as the annular recess 265b, and the first gasket 267a can similarly seal the interface between the inner housing portion 246 and the outer surface of the first side wall 232a. In some embodiments, the gaskets 267a, b can be formed from rubber and/or other resiliently compressible materials. In other embodiments the gaskets 267a, b can be formed from other suitable seal materials known in the art, including plastic, nylon, fiber materials, sealant compounds that harden or firm up after application, etc. In some embodiments, rather than annular or circular gaskets or seals, the gaskets 267a, b can have other shapes, including rectangular shapes, square shapes, etc.

The inner housing portion 262 of the drive assembly housing 226 can be fixedly attached to the second side wall 232b using one or more of the fasteners 249 (e.g., screws, bolts, etc.). As described in greater detail below, the inner housing portion 262 includes an internal cavity configured to house a drive assembly 268. In some embodiments, the drive assembly 268 includes a driving or drive spring 266 (e.g., a spiral torsion spring) configured to resiliently bias the spool shaft 242 in a web-retraction direction of rotation. In some embodiments, the outer housing portion 264 of the drive assembly housing 226 can be fixedly attached to the inner housing portion 262 (to form, e.g., a hermetic seal) in the manner described above for attaching the outer housing portion 248 of the locking assembly housing 224 to the inner housing portion 246 (e.g., using laser, ultrasonic, hot plate and/or other suitable welding techniques, etc.).

Figure 3A:
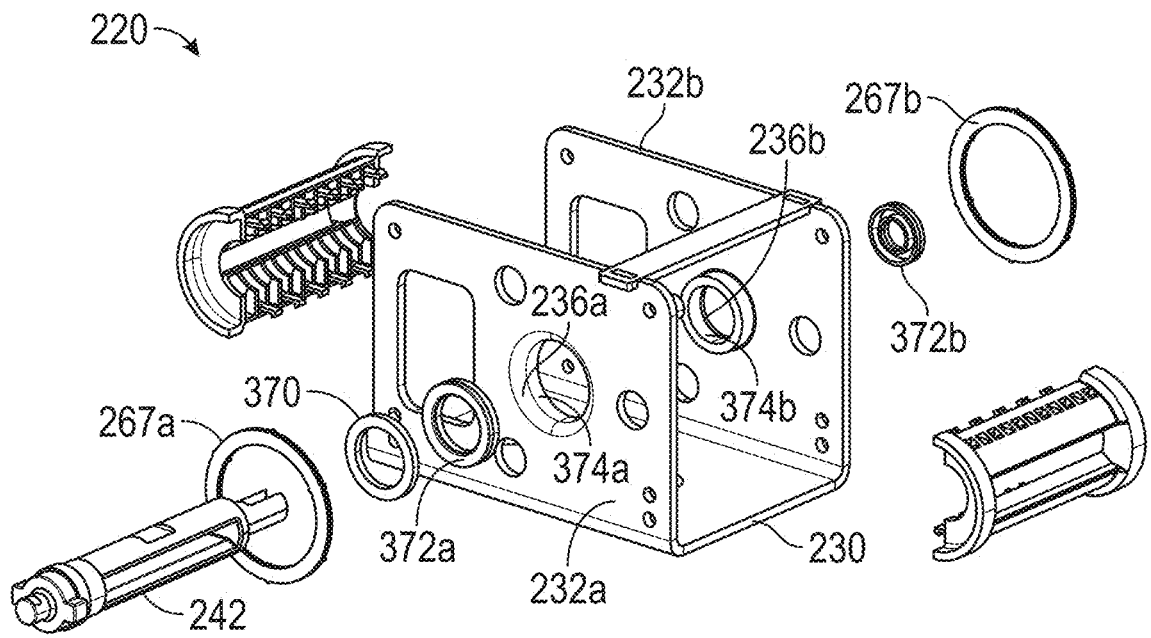
FIGS. 3A-3C are a series of partially exploded front isometric views of the web retractor of FIG. 2A configured in accordance with embodiments of the present technology.
Figure 3B:
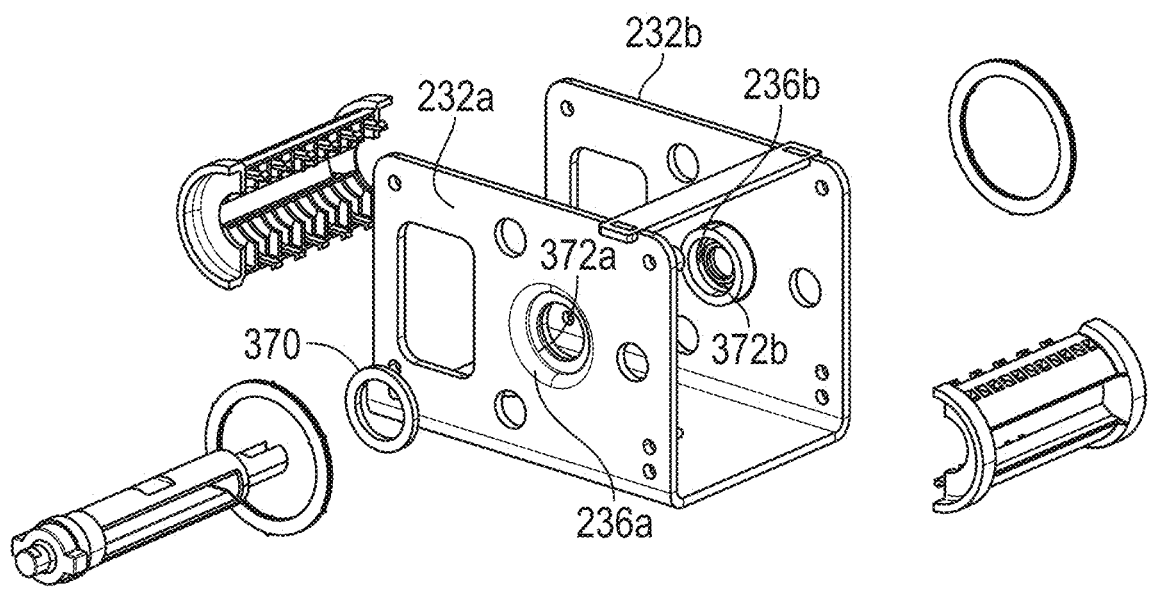
Figure 3C:
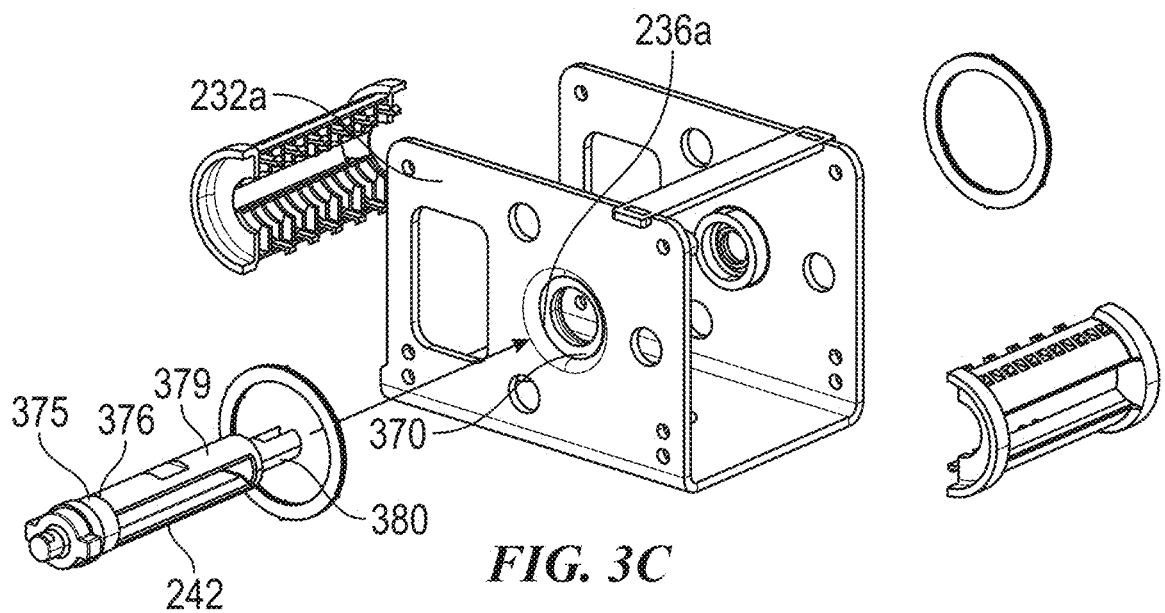
Figure 3D:
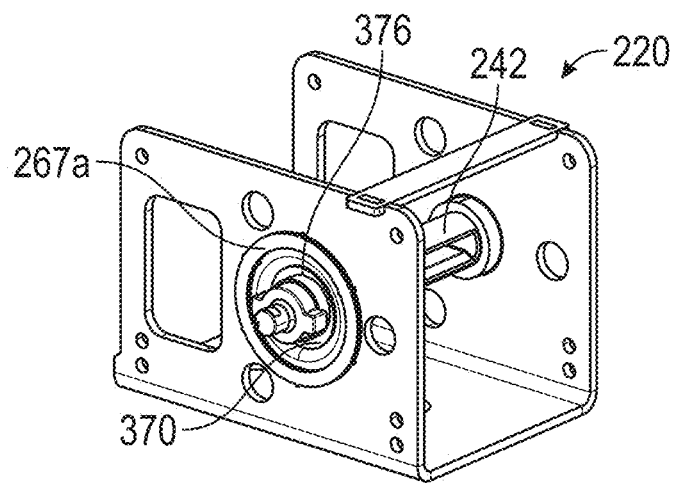
FIGS. 3D and 3E are left and right front isometric views, respectively, of the web retractor in a partially assembled configuration.
Figure 3E:
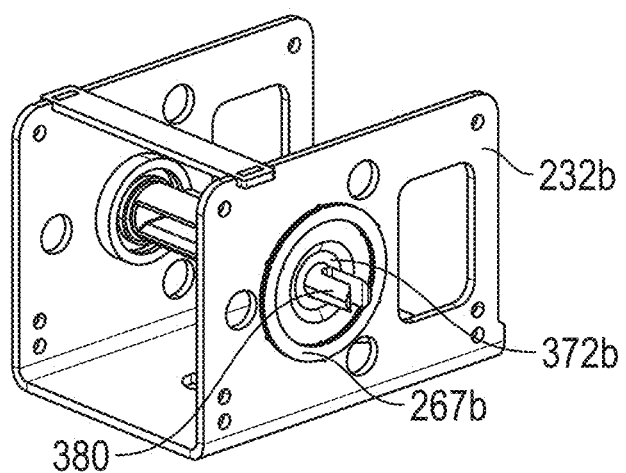
Figure 3F:
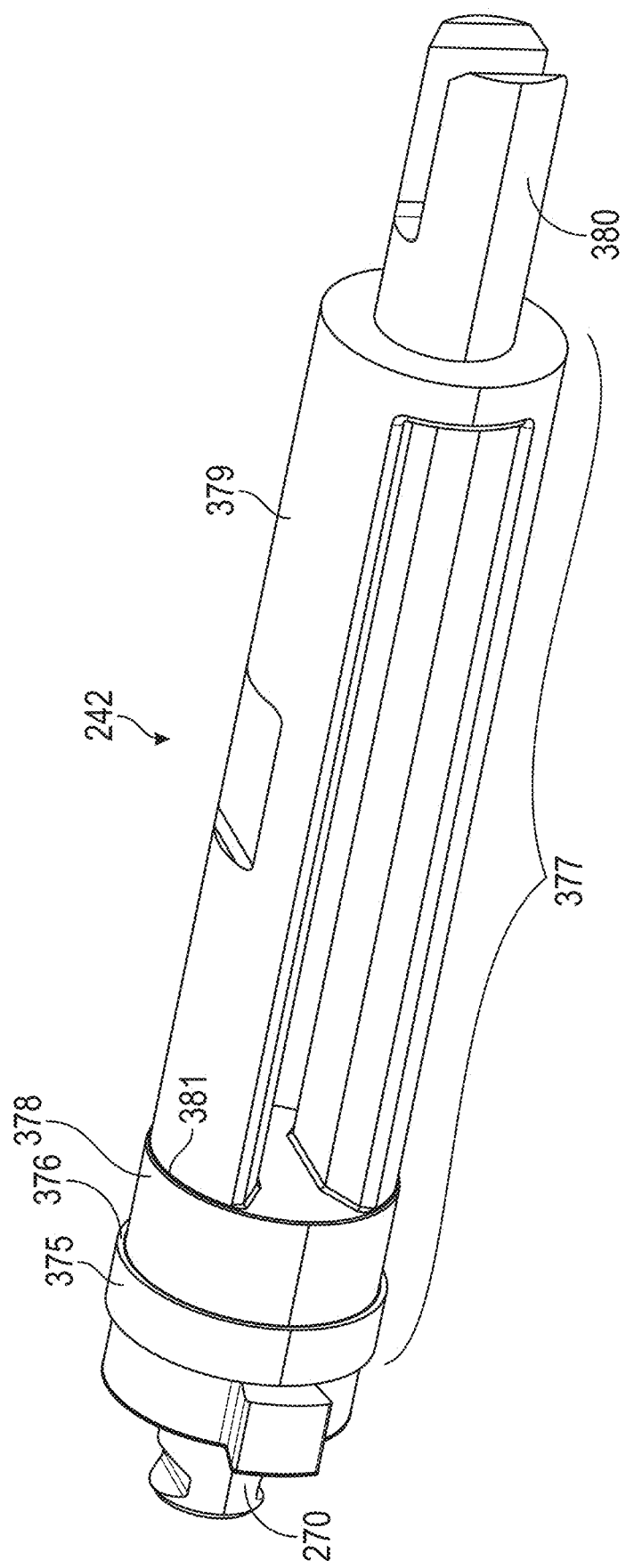
FIG. 3F is an enlarged isometric view of a spool shaft of the web retractor configured in accordance with embodiments of the present technology.

FIGS. 3A-3C are a series of partially exploded isometric views of the web retractor 220 with some components omitted for clarity, FIGS. 3D and 3E are left and right isometric views, respectively, of the web retractor 220 in a partially assembled configuration, and FIG. 3F is an enlarged isometric view of the spool shaft 242 configured in accordance with embodiments of the present technology. Referring first to FIG. 3A, the first opening 236a is formed in the first side wall 232a so that it has a first cylindrical flange 374a that extends inwardly from the first side wall 232a. Similarly, the second, smaller opening 236b formed in the second side wall 232b has a second cylindrical flange 374b that extends inwardly from the second side wall 232b. In some embodiments, the web retractor 220 further includes a first seal 372a configured to fit (e.g., firmly or relatively tightly) against the first flange 374a in the first opening 236a, and a second seal 372b, which is smaller in diameter than the first seal 372a, configured to fit (e.g., firmly or relatively tightly) against the second flange 374b in the second opening 236b. As described in more detail below, in some embodiments, the first and second seals can be annular lip seals (e.g., rotary lip seals) having sealing lips that define open channels which open inwardly relative to the respective side walls 232a, b. In other embodiments, the web retractor 220 can include other types of suitable seals, seal members, etc. to fit in the openings 236a and 236b including, for example, O-Ring seals, metal seals, etc.

In some embodiments, the web retractor 220 further includes a bushing 370 configured to fit concentrically in the first opening 236a directly adjacent to the first seal 372a. In some embodiments, the bushing 370 can be an annular bushing or spacer made of metal (e.g., steel, aluminum, bronze, etc.) and having, e.g., a rectangular or square cross-sectional shape. In other embodiments, the bushing 370 can be made from other suitable materials known in the art (e.g., polymers, ceramics, etc.) and/or can have other configurations, cross-sectional shapes, etc. In yet further embodiments, it is contemplated that the bushing 370 may be omitted. Turning next to FIG. 3B, in this view the first seal 372a is installed in the first opening 236a and the second seal 372b is installed in the second opening 236b.

Referring next to FIG. 3F, in the illustrated embodiment the spool shaft 242 includes a mid-portion 377 extending between the first end portion 270 and a second end portion 380. In this embodiment, the mid-portion 377 includes a first shoulder portion 375 and a second shoulder portion 378 positioned toward the first end portion 270, and a spool portion 379 extending between the second shoulder portion 378 and the second end portion 380. The first shoulder portion 375 has an outer cylindrical surface that has a slightly larger diameter than the adjacent cylindrical surface of the second shoulder portion 378, and as a result a first annular step 376 (which can also be referred to as an annular wall, lip, etc.) extends (e.g., perpendicularly) between the two cylindrical surfaces. Additionally, it will be noted that the cylindrical surface of the second shoulder portion 378 has a slightly larger diameter than the cylindrical surface of the adjacent spool portion 379, which results in a second, relatively short, annular wall or step 381 extending between these two cylindrical surfaces. In some embodiments, the spool shaft 242 can be manufactured from a suitable metal (e.g., steel, aluminum, etc.) and/or other suitable materials known in the art, by, e.g., machining, casting, forging, etc.

As shown in FIG. 3C, after the first seal 372a has been positioned in the first opening 236a, the bushing 370 is positioned in the first opening 236a next to (e.g., in contact with and/or abutting) the first seal 372a. In some embodiments, to continue assembling the retractor 220 the second end portion 380 of the spool shaft 242 is inserted through the central openings in the bushing 370 and the first seal 372a and then through the central opening in the second seal 372b in the second side wall 232b until the first step 376 of the first shoulder portion 375 contacts and/or abuts the bushing 370 as shown in FIGS. 3D and 3E. As also shown in FIGS. 3D and 3E, the first annular gasket 267a is positioned against the outer surface of the first side wall 232a and the second annular gasket 267b is positioned against the outer surface of the second side wall 232b. It will be understood that during normal assembly, the annular gaskets 267a and 267b would, in most instances, be positioned first in the corresponding annular recesses 265a and 265b (FIG. 2B) in the inner housing portion 246 of the locking assembly housing 224 and the inner portion housing 262 of the drive assembly housing 226, respectively, before the inner housing portions 246 and 262 are attached to the first and second side walls 232a and 232b, respectively.

Figure 4A:
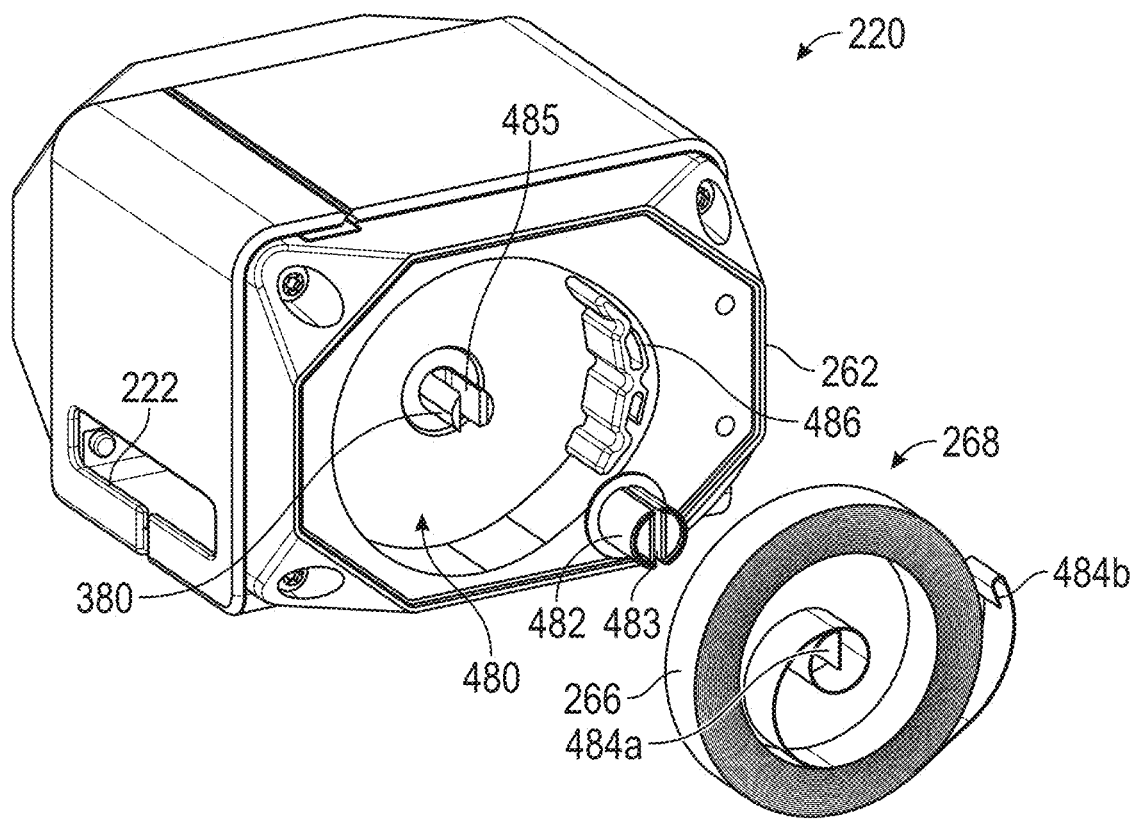
FIG. 4A is a partially exploded right front isometric view of the web retractor of FIG. 2A configured in accordance with embodiments of the present technology.
Figure 4B:
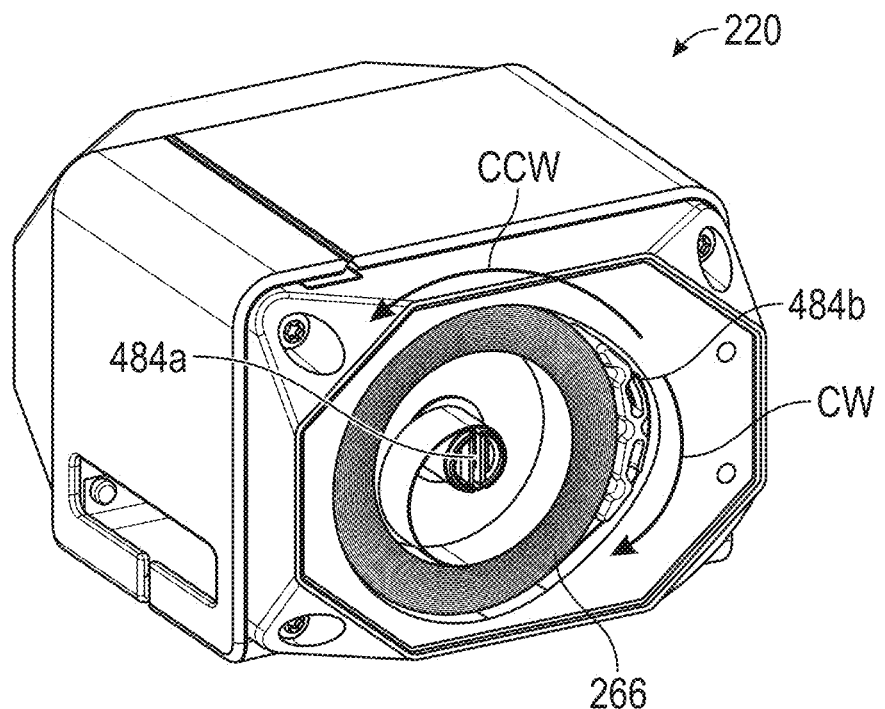
FIG. 4B is a similar isometric view of the web retractor in a partially assembled configuration.

FIG. 4A is a partially exploded right front isometric view of the web retractor 220 illustrating various features of the drive assembly 268 configured in accordance with embodiments of the present technology, and FIG. 4B is a similar isometric view of the web retractor 220 in a partially assembled configuration. Referring first to FIG. 4A, in the illustrated embodiment the inner housing portion 262 includes an inner cavity 480 configured to house the drive assembly 268. In some embodiments, the drive assembly 268 can include an end fitting 482 that is configured to fit onto the second end portion 380 of the spool shaft 242 (FIG. 3F). The end fitting 482 can include a slot 483 that is configured to be received in a corresponding notch or slot 485 in the second end portion 380. Additionally, the slot 483 is configured to receive and retain a first end portion 484a (e.g., an inner end portion) of the drive spring 266. In some embodiments, the drive assembly 268 can further include a clip fitting 486 that is positioned within the cavity 480 and configured to receive and retain a second end portion 484b (e.g., an outer end portion) of the drive spring 266. In some embodiments, the clip fitting 486 can be integrally formed as part of the inner housing portion 262.

Turning next to FIG. 4B, after the end fitting 482 has been fixedly positioned on the second end portion 380 of the spool shaft 242, the first end portion 484a of the drive spring 266 is fit into the slot 483 and retained by the end fitting 482, and the second end portion 484b is received and retained by the clip fitting 486. In some embodiments, the drive spring 266 can be pre-wound by rotation of the spool shaft 242 in a clockwise direction CW to impart a torsional biasing force on the spool shaft 242 in a counterclockwise direction CCW. This torsional force can in turn apply a tension force to a web (not shown) that is wound about the spool assembly 240 (FIG. 2B) and extended from the retractor 220. In some embodiments, this tension force enables the web to remain resiliently in place about a seat occupant when in use and be retracted back into the retractor 220 when not in use. For example, in some embodiments, extraction of the web from the retractor 220 via the opening 222 rotates the spool shaft 242 in the clockwise direction CW, thereby winding the drive spring 266 in the same direction and applying tension to the web. As a result, when the web is detached or otherwise released from, e.g., a buckle, the preload in the drive spring 266 causes the spool shaft 242 to rotate in the counterclockwise CCW direction and retract the web back into the retractor 220. In some embodiments, the drive spring 266 can be made from an elastic metal (e.g., hardened steel, spring steel, etc.) and/or other suitable material that can store sufficient energy to spring-load the spool shaft 242.

The drive assembly 268 described above is but one example of a representative drive assembly that can be used with embodiments of the retractor 220 in accordance with the present technology. Accordingly, in other embodiments the retractor 220 can include other types of drive assemblies and/or drive assemblies having different components and/or features than the drive assembly 268. Accordingly, it will be understood that embodiments of the present technology are not limited to use with any particular type of drive assembly unless otherwise stated.

Figure 5A:
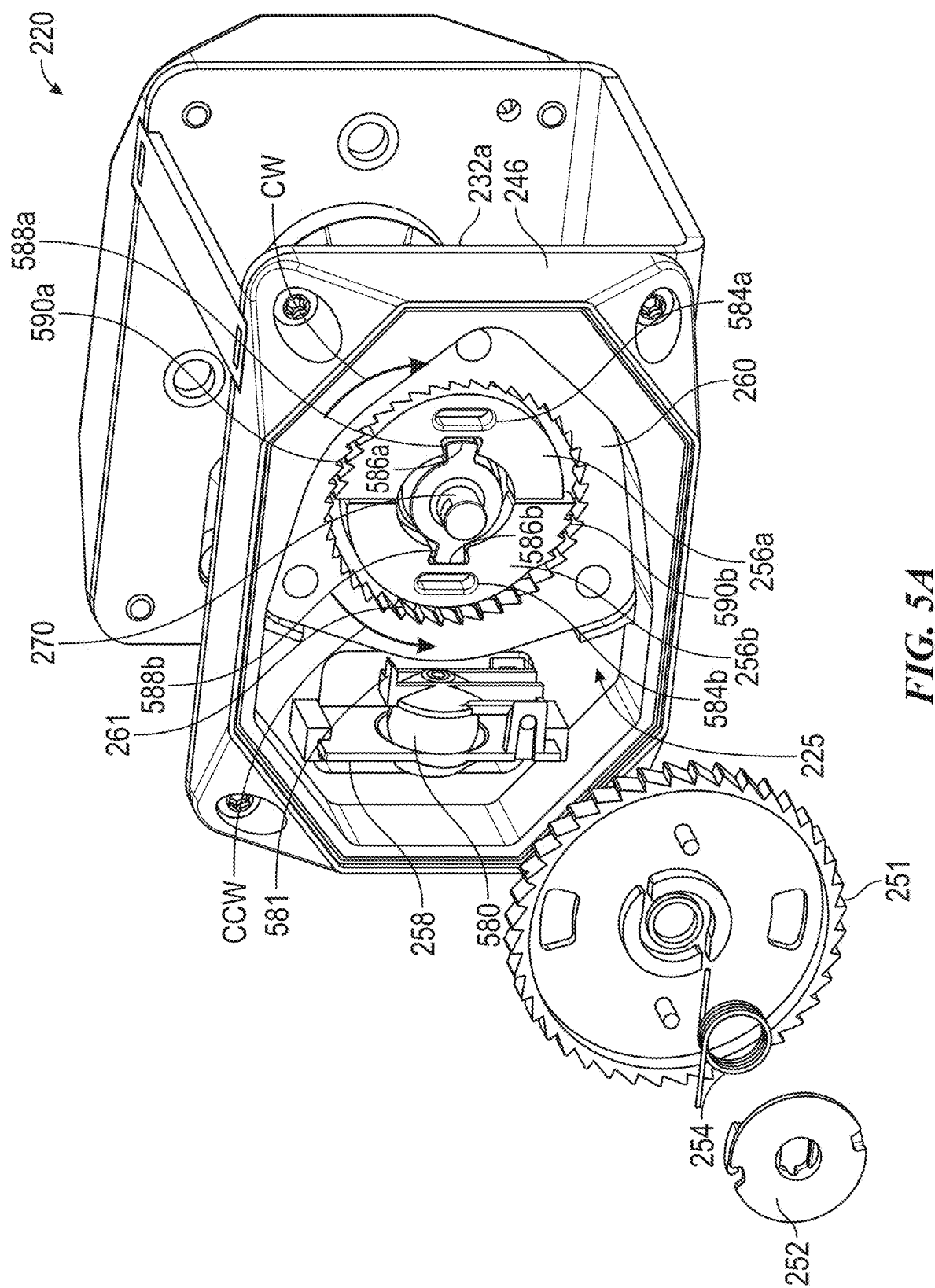
FIGS. 5A and 5B are partially exploded left front isometric views of the web retractor of FIG. 2A configured in accordance with embodiments of the present technology.
Figure 5B:
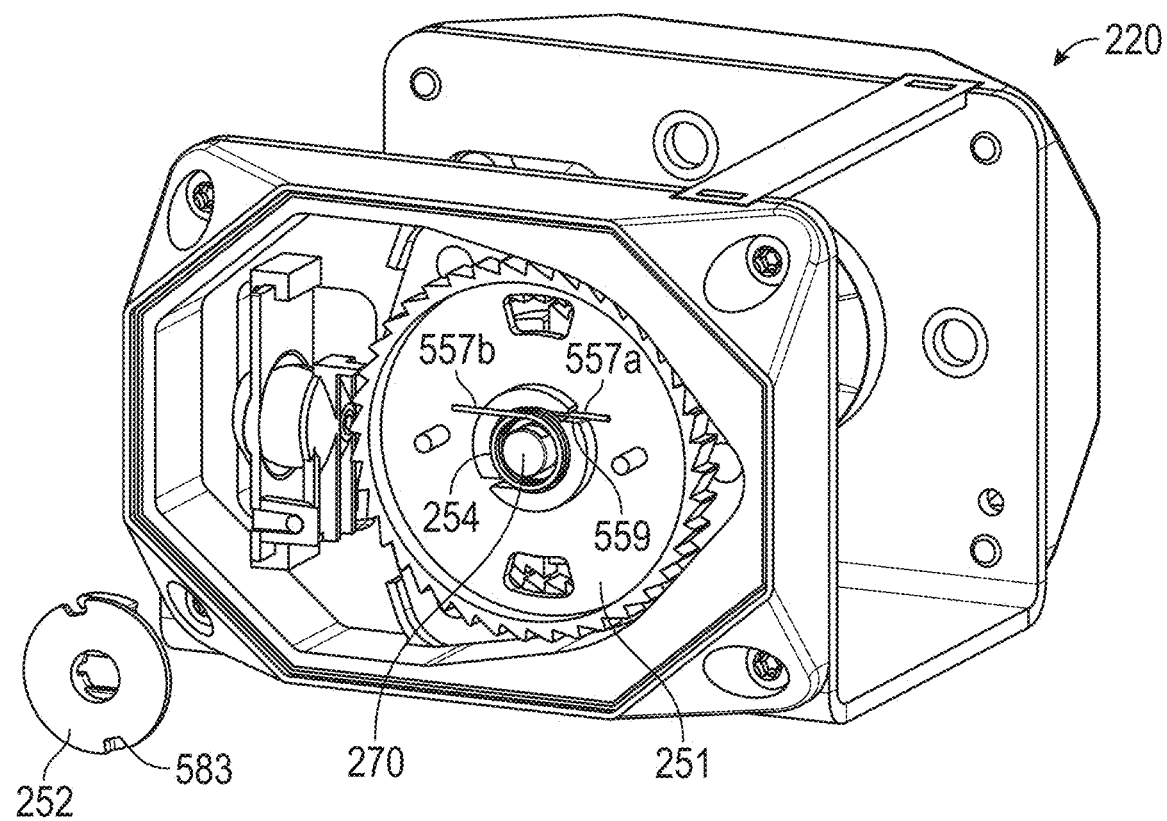
Figure 5C:
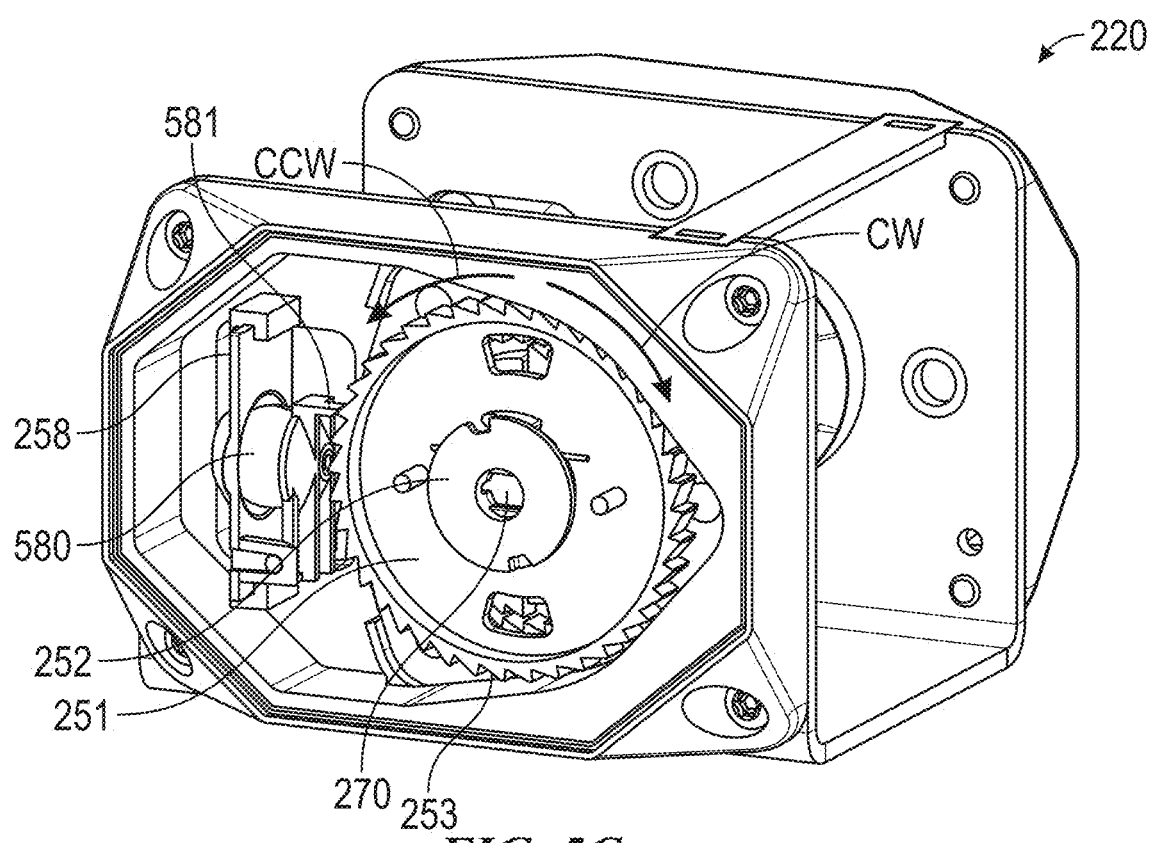
FIG. 5C is a similar isometric view of the web retractor in a partially assembled configuration.
Figure 5D:
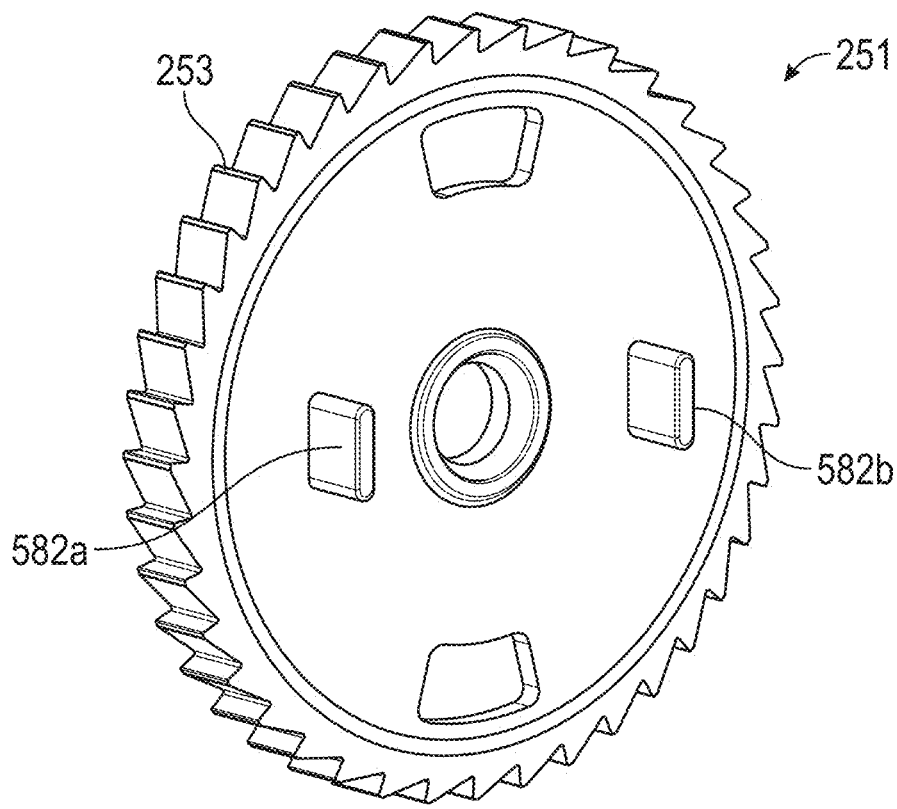
FIG. 5D is a rear isometric view of a lock wheel configured in accordance with embodiments of the present technology.

FIGS. 5A and 5B are partially exploded left front isometric views of the web retractor 220 configured in accordance with embodiments of the present technology, FIG. 5C is a similar isometric view of the web retractor 220 in a partially assembled configuration, and FIG. 5D is a rear isometric view of the lock wheel 251 configured in accordance with embodiments of the present technology. Referring first to FIGS. 5A and 5D together, the lock ring 260 is positioned in the cavity 225 of the inner housing portion 246 and fixedly attached to the first side wall 232*a* of the frame 230 as described above. Each of the locking pawls 256*a* and 256*b* is operably positioned within the opening in the lock ring 260 such that first and second engagement portions 588*a* and 588*b*, respectively, which are integrally formed on the spool shaft 242 and extend outwardly therefrom, are operably received in corresponding first and second guide features or recesses 586*a* and 586*b*, respectively, formed in the first and second locking pawls 256*a* and 256*b*, respectively. As shown in FIG. 5D, the lock wheel 251 includes first and second projecting tabs 582*a* and 582*b* (which can also be referred to as studs, posts, protrusions, etc.). The first and second projecting tabs 582*a* and 582*b* are operably received in corresponding first and second openings 584*a* and 584*b* in the first and second locking pawls 256*a* and 256*b*, respectively, when the lock wheel 251 is rotatably mounted to the first end portion 270 of the spool shaft 242 as shown in FIG. 5B. With continued reference to FIG. 5B, after the lock wheel 251 has been mounted to the first end portion 270 of the spool shaft 242, the spring 254 is positioned on the first end portion 270 such that a first end portion 557*a* of the spring 254 is received and retained by a slot 559 formed in an adjacent boss of the lock wheel 251.

Turning next to FIG. 5C, the retainer 252 is then fixedly coupled to the first end portion 270 of the spool shaft 242 (by means of, e.g., opposing tabs on an inner bore of the retainer 252 (not shown in FIG. 5C) that engage corresponding transverse slots or channels formed in the first end portion 270 of the spool shaft 242). When the retainer 252 is engaged with the first end portion 270 of the spool shaft 242, the spring 254 is wound (e.g., a portion of a full turn) and a second end portion 557*b* of the spring 254 is engaged with a slot or hook feature 583 (FIG. 5B) in the retainer 252 such and a torsional biasing force is exerted by the spring 254 on the lock wheel 251 in the counterclockwise CCW direction.

With continued reference to FIG. 5C, in some embodiments, the web inertia sensor 257 (FIG. 2B) and the vehicle inertia sensor 258 can lock rotation of the spool assembly 240 in a manner that is at least generally similar to conventional locking assemblies. For example, the web inertia sensor 257 can be activated when web extraction accelerates the rotational speed of the spool assembly 240 (by, e.g., rapid pulling of the web (not shown)) above a predetermined threshold level that is controlled by the torsion in the spring 254. More specifically, if the web is extracted from the retractor 220 at an acceleration that is below the threshold, the lock wheel 251 rotates with the spool shaft 242 in the counterclockwise CCW, and the spring 254 (FIG. 5B) biases the first and second projecting tabs 582*a* and 582*b* of the lock wheel 251 (FIG. 5D) against the upper and lower end walls of the first and second openings 584*a* and 584*b* in the first and second locking pawls 256*a* and 256*b* (FIG. 5A), respectively. As shown in FIG. 5A, when the projecting tabs 582*a*, *b* of the lock wheel 251 bias the locking pawls 256*a*, *b* in the counterclockwise CCW direction, first and second teeth portions 590*a* and 590*b* of the first and second locking pawls 256*a* and 256*b*, respectively, are held inwardly and spaced apart from the teeth 261 on the lock ring 260. This prevents the spool assembly 240 from locking when the web is extracted from the retractor 220 below the threshold acceleration. Conversely, if the web is extracted from the retractor 220 above the threshold acceleration, the rotational acceleration of the spool shaft 242 in the counterclockwise direction CCW is high enough that the inertia of the lock wheel 251 causes it to momentarily lag behind the rotation of the spool shaft 242 and counteract the torsional biasing force of the spring 254, thereby causing the lock wheel 251 to momentarily rotate in the clockwise CW direction relative to the spool shaft 242. This rotation causes the projecting tabs 582*a*, *b* on the lock wheel 251 to bear against the lower and upper end portions of the openings 584*a*, *b* in the locking pawls 256*a*, *b*, respectively, and bias the locking pawls 256*a*, *b* in the clockwise CW direction. This biasing force causes the locking pawls 256*a*, *b* to pivot slightly about the engagement portions 588*a*, *b*, respectively, on the spool shaft 242, respectively. As the locking pawls 256*a*, *b* pivot in this manner, the teeth portions 590*a*, *b* on the locking pawls 256*a*, *b*, respectively, move outwardly from the spool shaft 242 and engage the teeth 261 on the lock ring 260. This locks the spool assembly 240 and prevents further extraction of the web from the retractor 220. It will be understood that, in some embodiments, extraction of the web above the threshold acceleration can be caused by rapid movement of the seat occupant (not shown in FIG. 5C) resulting from a crash, rapid deceleration, and/or other potentially harmful situation in which the seat occupant should be restrained in the seat. Once the tension in the web is released, the drive spring 266 (FIG. 4B) rotates the spool shaft 242 in the clockwise direction CW and the spring 254 biases the lock wheel 251 back in the counterclockwise CCW direction, thereby causing the teeth portions 590*a*, *b* of the locking pawls 256*a*, *b*, respectively, to move inwardly and disengage the teeth 261 on the lock ring 260. This releases the spool assembly 240 and enables the web to again be retracted back into, and extracted from, the retractor 220.

As shown in FIG. 5C, the inertia sensor 258 includes a ball (e.g., a metal ball, for example, a steel ball) carried by a basket formed by opposing concave surfaces. Movement of the ball acts on a pivotable pawl lever 581 that is configured to engage the teeth 253 on the exterior of the lock wheel 251 under certain inertial conditions. For example, in some embodiments, the vehicle inertia sensor 258 can be activated when acceleration or deceleration of the vehicle above a threshold level causes the ball 580 to move and push the pawl lever 581 into engagement with the outer teeth 253 of the lock wheel 251. Such an acceleration or deceleration may be caused by, for example, a vehicle impact, changes in vehicle orientation due to, e.g., an accident, a vehicle roll over, etc., and/or the vehicle climbing or descending a steep incline. When the pawl lever 581 engages the teeth 253 it locks the lock wheel 251, which in turn locks the spool assembly 240 via the locking pawls 256a, b and prevents further extraction of the web from the retractor 220. As will be appreciated the locking components of the locking assembly 250 can be actuated independently by either the vehicle inertia sensor 258 or the web inertia sensor 257, or by both the vehicle inertia sensor 258 and the web inertia sensor 257.

The various web locking features, components and mechanisms described above are only some examples of suitable web locking mechanisms, web inertia sensors, and/or vehicle inertia sensors that can be used with web retractors configured in accordance with embodiments of the present technology. In other embodiments, other types of web locking devices and systems, including vehicle inertia and/or web inertia systems, can be used with retractors configured in accordance with the present technology. Accordingly, it will be understood that embodiments of the present technology are not limited to use with any particular type of web locking assembly unless otherwise stated.

Figure 6:
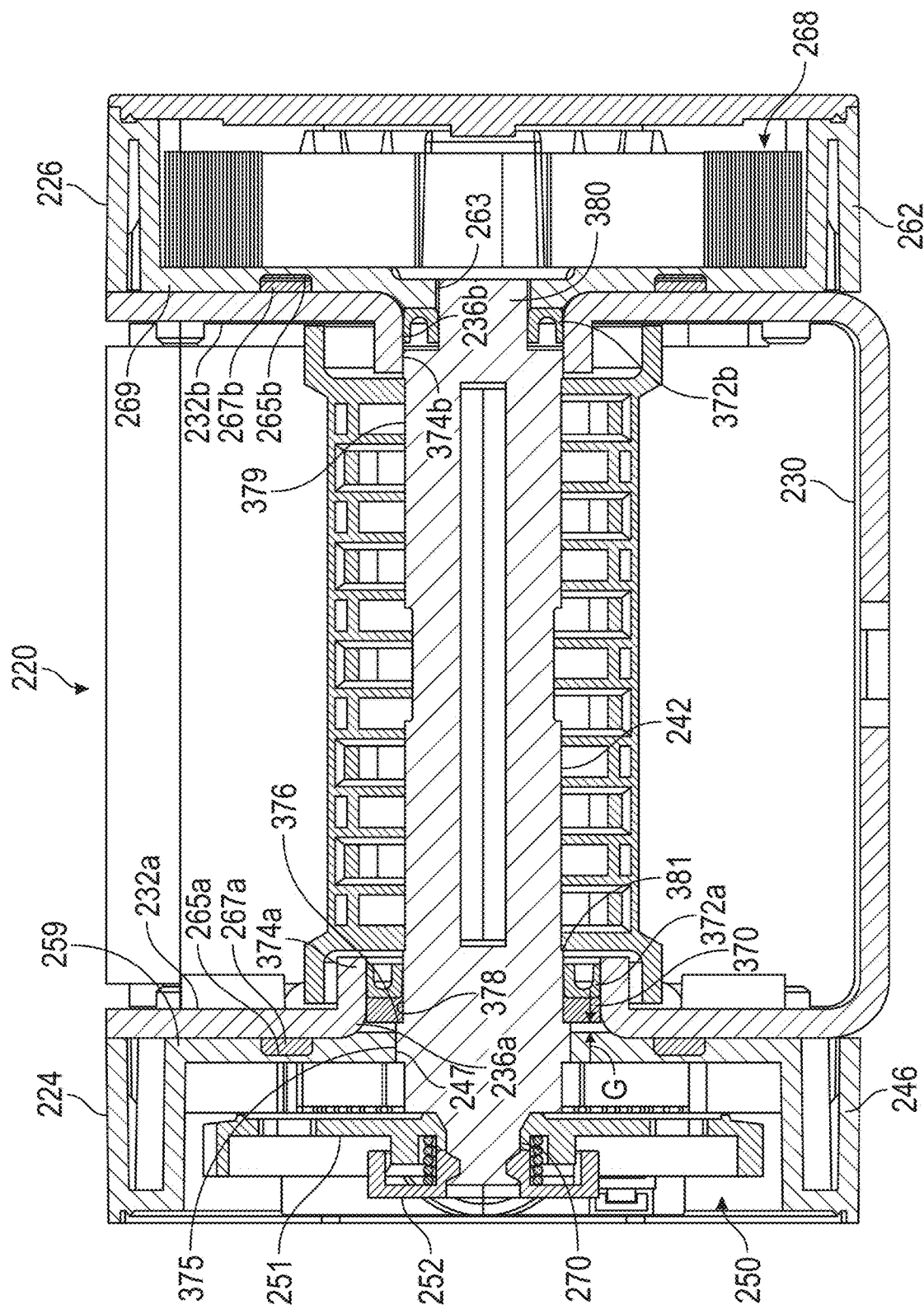
FIG. 6 is an enlarged front cross-sectional view of the web retractor of FIG. 2A configured in accordance with embodiments of the present technology.

FIG. 6 is a cross-sectional front view of the web retractor 220 configured in accordance with embodiments of the present technology. As this view illustrates, the first seal 372a operably extends between, and forms a seal between, the outer surface of the second shoulder portion 378 of the spool shaft 242 and the adjacent inner surface of the first flange 374a. Similarly, the second seal 372b extends between the second end portion 380 of the spool shaft 242 and the inner surface of the second flange 374b. In some embodiments, the first and second seals 372a and 372b can be annular lip seals (e.g., rotary lip seals formed of, e.g., rubber and, in some embodiments, including a metal insert, spring, etc.) having sealing lips that define open channels which face inwardly relative to the respective side walls 232a and 232b. In other embodiments, the web retractor 220 can include other types of suitable seals, seal members, etc. to fit in the openings 236a and 236b including, for example, O-Ring seals, metal seals, etc.

In operation, the first seal 372a prevents, or at least restricts (e.g., inhibits), moisture, fluids, dirt and/or other undesirable substances from passing between the spool shaft 242 and first flange 374a and into the locking assembly housing 224 where it could interfere with or otherwise impair operation of the locking assembly 250. The first annular gasket 267a is at least partially compressed between, and thereby forms a seal between, the base wall 259 of the inner housing portion 246 and the first side wall 232a of the frame 230. As a result, the first gasket 267a prevents, or at least restricts, moisture, dirt, contaminants, and/or other undesirable substances from passing into the locking assembly housing 224 from between the interfacing surfaces of the locking assembly housing 224 and the first side wall 232a. Accordingly, the first seal 372a in conjunction with the first gasket 267a prevent, or at least substantially restrict, dirt, moisture, liquid, and/or other undesirable substances that could interfere with operation of the locking assembly 250 from entering the locking assembly housing 224.

Like the first seal 372a, the second seal 372b prevents, or at least restricts, moisture, fluids, dirt, debris and/or other undesirable substances from passing between the second end portion 380 of the spool shaft 242 and second flange 374b and into the drive assembly housing 226 where it could interfere with or otherwise degrade operation of the drive assembly 268. The second annular gasket 267b is at least partially compressed between the base wall 269 of the drive assembly housing 226 and the second side wall 232b to provide a seal that prevents moisture, dirt, etc. from flowing into the drive assembly housing 226 from between these surfaces. Accordingly, the second seal 372b in conjunction with the second gasket 267b provide a seal system that prevents, or at least substantially restricts, moisture, dirt, etc. from passing into the drive assembly housing 226 from outside the drive assembly housing 226 and potentially interfering with operation of the drive assembly 268.

As described above with reference to, e.g., FIG. 3C, in the illustrated embodiment the bushing 370 is positioned to bear against the first step 376 on the spool shaft 242. In this way, the first step 376 prevents the bushing 370 from moving outwardly toward the base wall 259 of the inner housing portion 246 and maintains a gap G therebetween. In some embodiments, the gap G can be between 0.01 inch and 0.10 inch, between 0.02 inch and 0.08 inch, or 0.04 inch. In other embodiments, the gap G can have other sizes. In yet other embodiments, it is contemplated that the bushing 370 may have other positions relative to the base wall 259, such as positions in which it contacts, or at least partially contacts, the base wall 259 to eliminate, or at least partially eliminate, the gap G therebetween.

In some embodiments, the retractor 220 can be configured so that normal operating loads on the spool shaft 242 are transferred into the frame 230 via the inner housing portion 246 of the locking assembly housing 224 and/or the inner housing portion 262 of the drive assembly housing 226. In other embodiments, the retractor 220 can be configured so that normal operating loads on the spool shaft 242 are transferred into the frame 230 directly via the first flange 374a of the first opening 236a and/or the second flange 374b of the second opening 236b.

In some embodiments of the present technology, the opening 247 in the base wall 259 and the first shoulder portion 375 of the spool shaft 242 are sized so that the opening 247 has a relatively close tolerance fit around the first shoulder portion 375. More specifically, in some embodiments the first shoulder portion 375 can fit within the opening 247 with enough clearance to rotate freely, but tight enough so that the base wall 259, and not the first flange 374a, carries the radial loads from that end of the spool shaft 242 that result from slight radial movement of the spool shaft under normal operating conditions of the retractor 220. Thus, in such embodiments, the second shoulder portion 378 of the spool shaft 242, the bushing 370, and the first opening 236a are sized so that the bushing 370 will not transfer any radial loads from the spool shaft 242 into first flange 374a under normal operation conditions. That is, the cumulative radial clearance between the outer diameter of the second shoulder portion 378 and the inner diameter of the bushing 370, and the outer diameter of the bushing 370 and the inner diameter of the first opening 236a, is greater than the radial clearance between the first shoulder portion 375 and the opening 247. Similarly, in some embodiments, the opening 263 in the base wall 269 and the second end portion 380 of the spool shaft 242 are sized so that the opening 263 has a relatively close tolerance fit around the second end portion 380. More specifically, in some embodiments the second end portion 380 can fit within the opening 263 with enough clearance to rotate freely, but tight enough so that base wall 269, and not the second flange 374b, carries the radial loads from that end of the spool shaft 242 under normal operating conditions. Thus, in such embodiments, the spool portion 379 of the spool shaft 242 and the second opening 236b are sized so that the spool shaft 242 will not transfer any radial loads into the second flange 374b under normal operation conditions. That is, the radial clearance between the outer diameter of the spool portion 379 and the inner diameter of the second opening 236b is greater than the radial clearance between the outer diameter of the second end portion 380 and the inner diameter of the opening 263. Accordingly, in some embodiments, the spool shaft 242 is configured to bear against the side wall of the opening 247 in the inner housing portion 246 and against the side wall of the opening 263 in the inner housing portion 262 during normal operation of the web retractor 220.

In some embodiments in which the spool shaft 242 transfers radial loads into the base wall 259 of the inner housing portion 246 under normal loading conditions, the second shoulder portion 378 of the spool shaft 242, the bushing 370, and the first opening 236a can be sized (or otherwise configured) so that the bushing 370 transfers radial loads from the spool shaft 242 directly into the frame 230 via the first flange 374a under high loading conditions. For example, such high loading conditions that the base wall 259 fails (or excessively deforms or deflects) as a result of the loads imposed by the spool shaft 242. Similarly, in some embodiments in which the spool shaft 242 transfers radial loads into the base wall 269 of the inner housing portion 262 under normal loading conditions, the spool portion 379 of the spool shaft 242 and the second opening 236b can be configured so that the spool shaft 242 transfers radial loads directly into the frame 230 via the second flange 374b under high loading conditions. For example, such high loading conditions that the base wall 269 fails as a result of the loads imposed by the spool shaft 242. Accordingly, it will be understood that, in some embodiments, the first flange 374a and the second flange 374b can act as failsafe features to retain and prevent excess movement of the spool shaft 242 under high and/or extreme load conditions.

Although the various embodiments of the opening 247, the bushing 370, the first opening 236a, the second opening 236b, and/or the opening 263, as well as various ways of carrying operating loads from the spool shaft 242 into the inner housing portion 246, the inner housing portion 262, and/or the frame 230 have been described above, the present technology is not limited to any particular feature sizing, configuration and/or load path unless otherwise specified. In other embodiments, the spool shaft 242 can transfer operating loads into the frame 230 via load paths that differ from those described above. For example, in some embodiments one or more of the web retractor components described above can be configured so that the spool shaft 242 transfers normal operating loads, not just high operating loads, into the frame 230 via the flanges 374a, b. Additionally, it will be understood that the various embodiments of the web retractor 220 described herein can be used in either of the two occupant restraint systems described above with reference to FIGS. 1A and 1B, as well as numerous other occupant restraint systems.

Aspects of the present technology can be modified, if necessary, to employ the systems, functions, and concepts of the various references described above to provide yet further implementations of the present technology. The teachings of the present technology provided herein can be applied to other systems, not necessarily the system described above. The elements and features of the various examples described above can be combined to provide further implementations of the present technology. Some alternative implementations of the present technology may include not only additional elements to those implementations noted above, but also may include fewer elements. Further any specific numbers noted herein are only examples: alternative implementations may employ differing values or ranges.

As used herein, the use of relative terminology, such as "about", "generally", "approximately", "substantially" and the like refer to the stated value plus or minus ten percent. For example, the use of the term "about 100" refers to a range of from 90 to 110, inclusive. In instances in which the context requires otherwise and/or relative terminology is used in reference to something that does not include, or is not related to, a numerical value, the terms are given their ordinary meaning to one skilled in the art. As used herein, the term "and/or" when used in the phrase "A and/or B" means "A, or B, or both A and B." A similar manner of interpretation applies to the term "and/or" when used in a list of more than two terms.

References throughout the foregoing description to features, advantages, or similar language do not imply that all of the features and advantages that may be realized with the present technology should be or are in any single embodiment of the present technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the present technology can be modified, if necessary, to employ the systems, functions, and concepts of the various references described above to provide yet further implementations of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize.

While the above description describes various embodiments of the present technology and the best mode contemplated, regardless how detailed the above text, the present technology can be practiced in many ways. Details of the system may vary considerably in its specific implementation, while still being encompassed by the present disclosure. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific examples disclosed in the specification, unless the above Detailed Description section explicitly defines such terms. Accordingly, the actual scope of the present technology encompasses not only the disclosed examples, but also all equivalent ways of practicing or implementing the present technology under the claims.

From the foregoing, it will be appreciated that specific embodiments of the present technology have been described herein for purposes of illustration, but that various modifications may be made without deviating from the spirit and scope of the various embodiments of the present technology. Further, while various advantages associated with certain embodiments of the present technology have been described above in the context of those embodiments, other embodiments may also exhibit such advantages, and not all embodiments need necessarily exhibit such advantages to fall within the scope of the present technology. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A web retractor, comprising:
    a frame having a first side wall and a second side wall, wherein the first side wall includes a first opening formed therein, and wherein the second side wall includes a second opening formed therein;
    a spool shaft extending through the first opening and the second opening, wherein the spool shaft is rotatable relative to the frame;
    a locking assembly housing coupled to the first side wall and defining a cavity;
    a locking assembly positioned within the cavity, wherein the locking assembly is operably coupled to the spool shaft and configured to selectively lock rotation of the spool shaft; and
    a seal radially positioned between the spool shaft and the first side wall within the first opening, wherein the seal contacts the spool shaft.

2. The web retractor of claim 1 wherein the seal has an annular shape and is configured to inhibit undesirable substances from passing into the cavity from between the spool shaft and the first side wall.

3. The web retractor of claim 1 wherein the first side wall includes a cylindrical flange defining the first opening, and wherein the seal is positioned between the spool shaft and the cylindrical flange.

4. The web retractor of claim 1 wherein the seal is a lip seal.

5. The web retractor of claim 1 wherein the locking assembly housing includes a base wall positioned against the first side wall, and wherein the seal is spaced apart from the base wall by a gap therebetween.

6. The web retractor of claim 1, further comprising a bushing positioned between the spool shaft and the first side wall within the first opening.

7. The web retractor of claim 6 wherein the locking assembly housing includes a base wall positioned against the first side wall, wherein the bushing is positioned between the base wall and the seal, and wherein the bushing is spaced apart from the base wall by a gap therebetween.

8. The web retractor of claim 6 wherein the spool shaft includes an annular step positioned to bear against the bushing and prevent the bushing from moving toward the locking assembly.

9. The web retractor of claim 1 wherein the locking assembly housing includes a base wall positioned against the first side wall, wherein the seal is a first seal, and further comprising:
    a second seal positioned between the base wall and the first side wall to inhibit the undesirable substances from passing into the cavity from between the base wall and the first side wall.

10. The web retractor of claim 9 wherein the base wall includes a third opening coaxially aligned with the first opening and an annular recess disposed around the third opening, and wherein the second seal is positioned at least partially within the annular recess.

11. The web retractor of claim 1 wherein the locking assembly housing includes a base wall positioned against the first side wall, wherein the base wall defines a third opening coaxially aligned with the first opening, wherein the spool shaft extends through the third opening, and wherein the third opening and the spool shaft are sized such that the base wall radially supports the spool shaft during normal loading conditions of the web retractor.

12. The web retractor of claim 11, further comprising a bushing axially positioned between the spool shaft and the first side wall within the first opening, wherein the first opening and the bushing are sized such that the first side wall provides at least some radial support to the spool shaft during high loading conditions of the web retractor that exceed the normal loading conditions.

13. The web retractor of claim 1 wherein the seal contacts the first sidewall.

14. A web retractor, comprising:
    a frame having a first side wall and a second side wall, wherein the first side wall includes a first opening formed therein, and wherein the second side wall includes a second opening formed therein;
    a spool shaft extending through the first opening and the second opening, wherein the spool shaft is rotatable relative to the frame;

a locking assembly housing coupled to the first side wall and defining a cavity, wherein the locking assembly housing includes a base wall positioned against the first side wall;

a locking assembly positioned within the cavity, wherein the locking assembly is operably coupled to the spool shaft and configured to selectively lock rotation of the spool shaft; and a seal radially positioned between the spool shaft and the first side wall within the first opening, wherein the seal is spaced apart from the base wall by a gap therebetween, and wherein the seal contacts the spool shaft.

15. The web retractor of claim 14 wherein the seal has an annular shape and is configured to inhibit undesirable substances from passing into the cavity from between the spool shaft and the first side wall.

16. The web retractor of claim 14, further comprising a bushing positioned between the spool shaft and the first side wall within the first opening.

17. The web retractor of claim 16 wherein the gap is a first gap, wherein the bushing abuts the seal, and wherein the bushing is spaced apart from the base wall by a second gap therebetween.

18. The web retractor of claim 14 wherein the cavity is a first cavity, and further comprising:

a drive assembly housing coupled to the second side wall and defining a second cavity; and a second seal positioned between the spool shaft and the second side wall within the second opening.

19. A web retractor, comprising:

a frame having a first side wall and a second side wall, wherein the first side wall includes a first opening formed therein, and wherein the second side wall includes a second opening formed therein;

a spool shaft extending through the first opening and the second opening, wherein the spool shaft is rotatable relative to the frame about a longitudinal axis;

a locking assembly housing coupled to the first side wall and defining a cavity, wherein the locking assembly housing includes a base wall positioned against the first side wall;

a locking assembly positioned within the cavity, wherein the locking assembly is operably coupled to the spool shaft and configured to selectively lock rotation of the spool shaft;

a seal radially positioned between the spool shaft and the first side wall within the first opening; and a bushing radially positioned between the spool shaft and the first side wall within the first opening, wherein the bushing is spaced apart from the base wall by a gap therebetween, and wherein the bushing is positioned side-by-side with the seal along the longitudinal axis.

20. The web retractor of claim 19 wherein the first seal and the bushing both contact the first sidewall and the spool shaft.

* * * * *